United States Patent [19]
Hansen

[11] 3,736,731
[45] June 5, 1973

[54] DETASSELING APPARATUS

[75] Inventor: Harold Valentine Hansen, Rock Island County, Cordova, Ill.

[73] Assignee: Deere & Company, Moline, Ill.

[22] Filed: June 30, 1971

[21] Appl. No.: 158,260

[52] U.S. Cl. .................................. 56/63, 56/289
[51] Int. Cl. ................................. A01d 45/02
[58] Field of Search ............... 56/63, 56, 53, 289, 56/252

[56] References Cited

UNITED STATES PATENTS

| 2,958,175 | 11/1960 | Sprinkle | 56/63 X |
| 2,772,533 | 12/1956 | Shibley | 56/252 |
| 2,632,988 | 3/1953 | Pollard et al. | 56/53 X |

FOREIGN PATENTS OR APPLICATIONS

| 609,777 | 10/1960 | Italy | 56/56 |

*Primary Examiner*—F. Barry Shay
*Assistant Examiner*—J. N. Eskovitz
*Attorney*—H. Vincent Harsha, Harold M. Knoth, William A. Murray et al.

[57] ABSTRACT

Apparatus for mechanically removing the tassels from corn plants in a plurality of adjacent rows, the apparatus including a mobile frame adapted to advance along the rows and a plurality of individual detasseling units adjustably carried by the frame for receiving the plants in the adjacent rows and severing the tassels therefrom. Each detasseling unit consists of a housing defining a fore-and-aft passage for receiving the upper portions of the plants, a pair of guide members for directing the plants into the passage, and a circular blade mounted in canted fashion on a transverse shaft extending across the passage. As the shaft is rotated and the unit advanced along the plant row, the blade describes a substantially rectangular swath encompassing the tassel portion of the plants received within the housing, thereby severing the tassels from the plants. The configuration of the housing is such that the leaves of the plants are excluded from the passage and are thus not contacted by the blade.

9 Claims, 5 Drawing Figures

INVENTOR.
HAROLD V. HANSEN

INVENTOR.
HAROLD V. HANSEN
BY
John O. Hayes
ATTORNEY

DETASSELING APPARATUS

BACKGROUND OF THE INVENTION

The present invention relates generally to crop-treating machines, and more particularly to apparatus for mechanically detasseling corn plants.

The production of hybrid seedcorn involves the cross-fertilization or pollination of two separate strains or varieties of corn plants, to obtain a third strain possessing the desirable properties of both parent strains. In actual practice, such cross-fertilization is achieved by planting a seed-producing field with alternate areas of the two strains, permitting the chosen male strain to cross-fertilize the female strain, and harvesting the latter for seed. Since the corn plant is bisexual, or contains both the male and female reproductive organs in the form of the tassel and silk, respectively, it is necessary, to prevent self-fertilization of the chosen female strain, to remove the tassel portion therefrom before it produces pollen.

The detasseling operation has heretofore been performed almost exclusively with manual labor. Although attempts have been made to produce a mechanical detasseler, these attempts have not succeeded in producing a machine capable of severing the entire tassel from the plant without materially damaging the leaves and stalk, which at the same time is capable of high-speed operation and is relatively low in cost. The detasseling operation is rather critical in that the entire tassel must be removed, to prevent the production of pollen and the resulting self-fertilization of the seed-producing female strain, while at the same time those portions of the plant adjacent to the tassel must be left undamaged, to avoid killing or stunting the growth of the plant. It is in the latter respect that most prior art mechanical detasselers have failed, since the majority of such devices indiscriminately remove the upper portion of the plant.

SUMMARY OF THE INVENTION

Accordingly, it is the primary object of the present invention to provide mechanical detasseling apparatus capable of completely removing the tassel portion of the plant without damaging the remaining portions thereof. It is a further object to provide such apparatus that is capable of relatively high-speed operation. It is yet a further object to provide apparatus of the aforesaid character that is simple and economical to manufacture.

The invention comprises, generally, a mobile frame adapted to advance along parallel rows of corn plants, there being a plurality of transversely spaced detasseling units adjustably mounted on the frame and adapted to receive the plants in adjacent rows. Each of the units is substantially identical and comprises a housing having a fore-and-aft passage for the tassel portion of the plants, guide means for directing the plants into the passage, and rotary blade means mounted in the passage to sever the tassels from the stalks. The blade means comprises a substantially planar, circular blade having a sawtooth edge, the blade being mounted in canted fashion on a driven shaft extending transversely across the passage defined by the housing. As the unit is advanced along the plant row, the blade thus reciprocates transversely in the passage, thereby defining a substantially rectangular swath encompassing the tassels of the plants received by the unit. The housing is formed of spaced-apart, generally vertical sidewalls, the lower portions of which converge downwardly to exclude the upper leaves of the plants from the passage and thereby prevent the leaves from coming into contact with the blade. Each of the units is mounted on the frame for on-the-go adjustment of its vertical position, to accommodate varying plant heights.

BRIEF DESCRIPTION OF THE DRAWINGS

The preferred embodiment of the present invention will be described in conjunction with the accompanying drawings in which.

DESCRIPTION OF THE PREFERRED EMBODIMENT

In the ensuing description, right- and left-hand reference is determined by facing the direction of travel of the apparatus.

Figure 1:
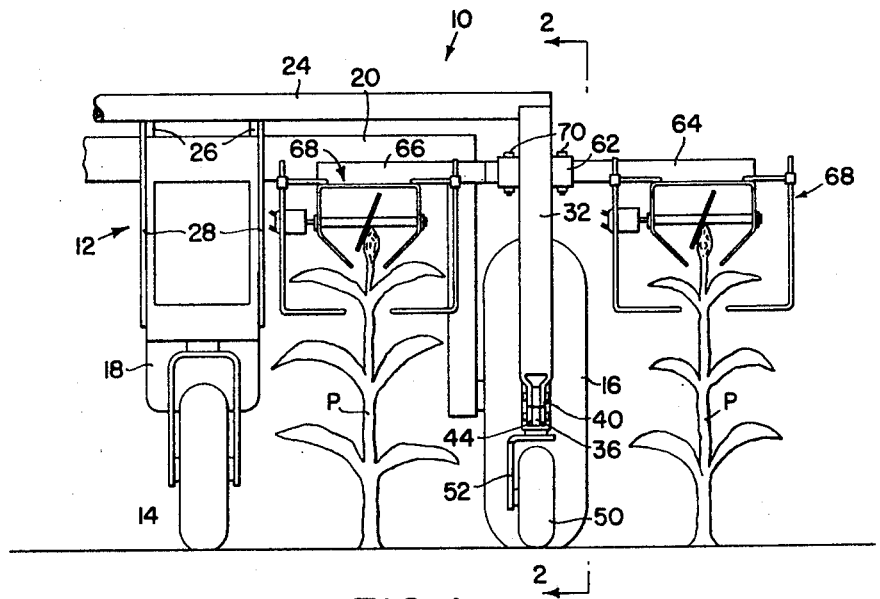
FIG. 1 is a fragmentary front elevation view of the preferred embodiment of the invention.
Figure 2:
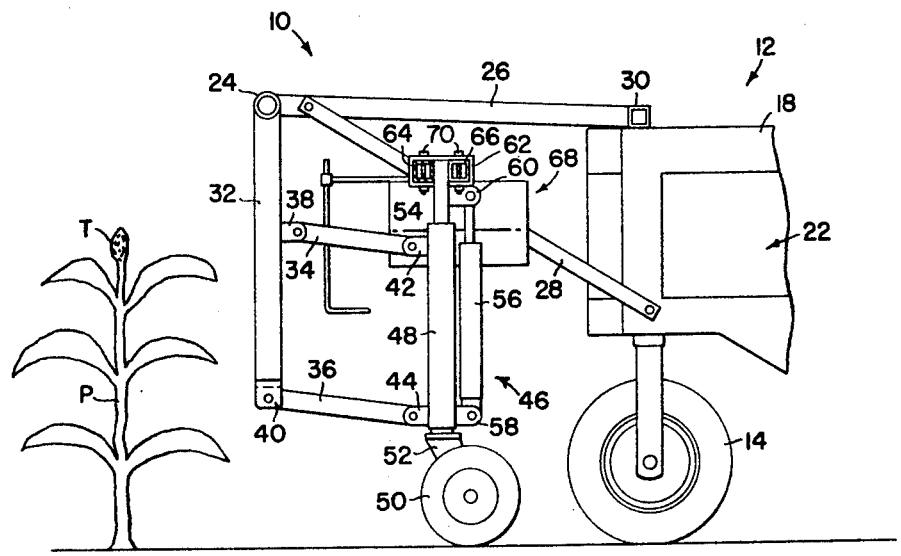
FIG. 2 is a fragmentary side elevation view of the apparatus taken along the line 2—2 of FIG. 1.

Referring first to FIGS. 1 and 2 of the drawings, the preferred embodiment of the invention comprises a frame structure indicated generally by the numeral 10, the structure being mounted on and extending forwardly from the front portion of an agricultural tractor, shown fragmentarily at 12. The tractor 12 is of the tricycle type, including a front steerable wheel 14 and a pair of rear drive wheels 16 (only one being shown) and is constructed to advance along rows of relatively tall corn plants, indicated generally by the letter P. For this purpose, the tractor includes an elongated, relative high and narrow body portion 18 and a rear wheel support structure 20 extending outwardly and downwardly from the upper rear portion of the body 18, over the tops of the plants P and downwardly between adjacent rows thereof. The vehicle is driven by an internal combustion engine contained within an engine compartment 22 in the body 18.

The frame structure 10 comprises a transversely extending member 24 supported forwardly of the tractor 12 by means of upper and lower pairs of braces 26 and 28, respectively, the former extending substantially horizontally from the opposite ends of a square tube 30 fixed to the top of the tractor body 18 and secured at their forward ends to the member 24, and the latter extending upwardly and forwardly from the opposite sides of the body 18 to the outer end portions of the braces 26. Depending downwardly from the left outer end of the transverse member 24, between adjacent rows of plants P, is a vertical support 32. Although only the apparatus to the left side of the tractor is shown in the drawings, in the preferred embodiment of the invention substantially identical apparatus is included to the right side of the tractor. A pair of upper and lower parallel links 34 and 36 extend rearwardly from brackets 38 and 40, respectively, on the support 32, to brackets 42 and 44, respectively, on a vertical, wheel-supported carriage 46. The carriage 46 comprises a vertical, tubular member 48 supported at its lower end by a castor wheel 50, the wheel 50 being rotatably carried on a U-shaped support 52 which, in turn, is received in the lower end of the member 48 for free pivotal movement about a substantially vertical axis. It will be apparent from the structure described that although the member 24 and support 32 are rigidly secured to the tractor 12, the carriage 46, by virtue of the castor wheel 50 and the connecting links 34 and 36, is free to float vertically to follow the contour of the ground between plant rows.

Telescopically received in the upper end of the tubular member 48 is a member 54, the vertical position of which is adjustable relative to the member 48 by means of an extensible and retractable hydraulic ram 56 acting between a pair of brackets 58 and 60, on the lower end of the member 48 and on the upper end of the member 54, respectively. A support bracket 62 is fixed to the upper end of the member 54 and, in conjunction therewith, forms a fore-and-aft pair of transversely extending, substantially square pockets for receiving the inner ends of detasseling unit support tubes 64 and 66, respectively. Each of the tubes 64 and 66 carries an identical detasseling unit 68 on its outer end in overlying relation with adjacent rows of plants P. The ram 56 is operable by conventional means to raise and lower the member 54 and thereby adjust the vertical position of the units 68 relative to the plants P, as the tractor 12 advances along the rows. Each of the support tubes 64 and 66 contains a plurality of transversely spaced vertical apertures in its inner end which may be selectively aligned with apertures in the top and bottom walls of the support bracket 62 to adjust the lateral position of the unit 68 and to thereby accommodate different row spacings. A pair of releasable fasteners such as bolts 70 are employed to retain each of the tubes 64 and 66 in their desired positions.

Figure 3:
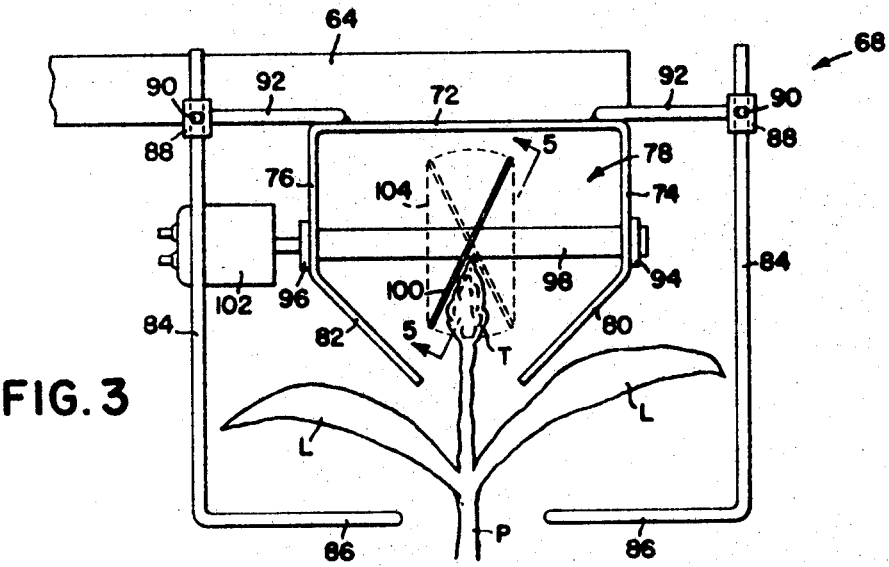
FIG. 3 is an enlarged front elevation view of one of the detasseling units.
Figure 4:
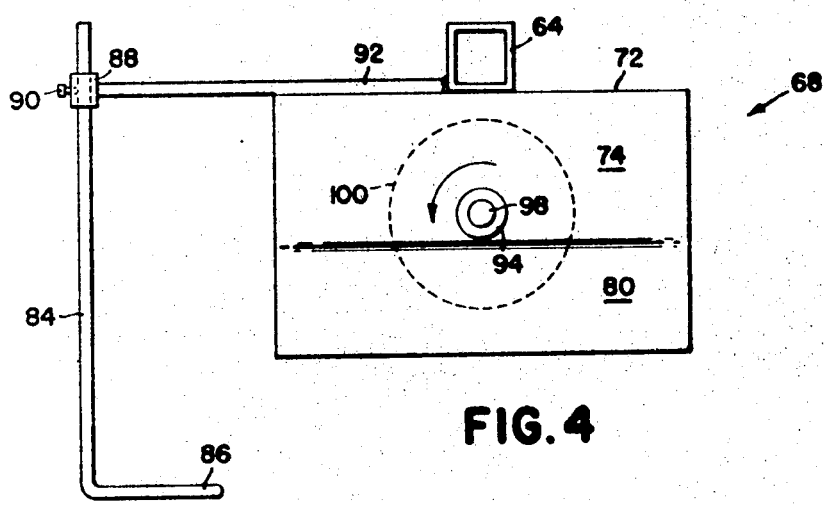
FIG. 4 is a side elevation view of a detasseling unit on the same scale as FIG. 3.
Figure 5:
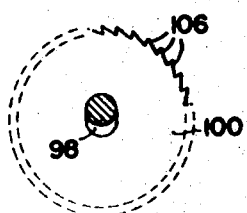
FIG. 5 is a view taken along the line 5—5 of FIG. 3.

Referring now to FIGS. 3-5 which illustrate a detasseling unit 68 in greater detail, it will be seen that the unit comprises a housing structure formed of a substantially horizontal top wall 72 secured to the bottom wall of the tube 64, and a pair of left and right spaced sidewalls 74 and 76, respectively, depending downwardly and inwardly from the opposite longitudinal edges of the wall 72. The walls 72, 74 and 76 conjunctively define a fore-and-aft passage 78 for the tassel portion T of the corn plant P. As illustrated best in FIG. 3, the lower portions 80 and 82 of the walls 74 and 76, respectively, converge downwardly and act as shields to exclude the leaves L on the upper portion of the plant P from the passage 78.

A pair of L-shaped guide rods, having vertical portions 84 and horizontal portions 86, are positioned on opposite sides of the housing structure and forwardly thereof to guide the plants into the passage 78 as the apparatus is advanced along the plant row. The upper ends of the vertical portions 84 are received in vertically apertured cylindrical members 88 and are adjustably retained therein by means of setscrews 90, the members 88 being mounted on the outer ends of horizontal support rods 92 which, in turn, are fixed to and diverge forwardly from the top wall 72 of the housing. The setscrew adjustment permits both the height and the horizontal angle of the guide rod portions 86 to be adjusted to best suit the type of corn plant being detasseled.

Rotatably supported in bearings 94 and 96 in the walls 74 and 76, respectively, and extending transversely across the passage 78 defined thereby is a shaft 98 having a substantially planar and circular blade 100 affixed centrally thereto. A conventional hydraulic motor 102, supplied with hydraulic fluid under pressure from a source on the tractor 12, is operable to rotate the shaft 98 and thus the blade 100, in the direction indicated in FIG. 4. The axis of the shaft 98 intersects the center of the blade 100 and, as shown in FIG. 3, the plane of the blade forms an oblique angle with the shaft axis. As the shaft 98 is rotated, the blade 100 thus wobbles or reciprocates transversely within the housing, the extreme alternate position thereof being indicated with a dashed line at 101 in FIG. 3. As the apparatus is advanced forwardly along the plant row, the blade thus describes a substantially rectangular swath in a vertical plane extending transversely across the row, the outline of the swath being indicated with a dashed line at 104 in FIG. 3. The outer circular edge of the blade 100, as shown in FIG. 5, is provided with a plurality of sharp teeth 106. As the edge of the blade reciprocates rapidly across the upper portion of the plant contained within the passage 78, the tassel T is thus engaged by the teeth 106 and is severed from the stalk and discharged outwardly and rearwardly therefrom. It will be apparent that proper operation of the apparatus requires that the rearward velocity of the outer periphery of the blade 100 beneath the shaft 98 be substantially greater than the forward velocity of the tractor 12.

Although as previously noted the downwardly converging configuration of the sidewall or shield portions 80 and 82 acts to exclude the upper plant leaves L from the passage 78, if a leaf should enter the passage, the narrowness of the swath 104 described by the blade 100 reduces the likelihood of the leaf coming in contact with the blade. And, should such contact be made, the reciprocating action of the blade will tend to deflect the leaf to one side while inflicting minimum damage thereto.

In operation, the units 68 are adjusted transversely by means of the bolts 70 retaining the tubes 64 and 66 in the support bracket 62, so that the transverse spacing of the units conforms with the row spacing of the field to be detasseled, and are adjusted vertically by means of the hydraulic ram 56, so that the swath 104 described by the blades 100 coincides with the tassel portions T of the plants P. The blades 100 are then rotated rapidly by means of the hydraulic motors 102, and the tractor is advanced along the rows of plants. As previously indicated, the guide rod portions 86 direct the tassel portion of each succeeding plant in the row into the passage 78 defined by the housing structure, and the action of the blade 100 contained therein severs the tassel from the stalk. The vertical position of the unit 68 may be adjusted on the go by means of the hydraulic ram 56, to accommodate varying plant heights within the field.

I claim:

1. Corn detasseling apparatus comprising: mobile frame means adapted to advance along a row of corn plants; fore-and-aft extending, inverted U-shaped structure mounted on the frame means and defining a downwardly opening fore-and-aft passage for the tassel portion of the plants, said structure including a top and a pair of fore-and-aft extending, downwardly converging generally planar sides for excluding leaves of the plants from the passage; guide means engageable by the plants to guide the tassel portions thereof into the passage as the apparatus is advanced along the row; and blade means mounted within the passage to sever the tassels from the plants.

2. The invention defined in claim 1 wherein said blade means is rotatable about an axis extending substantially transversely across the passage.

3. The invention defined in claim 2 wherein said blade means is substantially planar and forms an oblique angle with said axis.

4. The invention defined in claim 3 wherein said blade means is substantially circular and is intersected substantially at its center by said axis.

5. Corn detasseling apparatus comprising: mobile frame means adapted to advance along a row of corn plants; housing means mounted on the frame means and having transversely opposed side walls defining a fore-and-aft passage for the tassel portion of the corn plants, the lower portions of the side walls extending downwardly and inwardly to exclude leaves of the corn plants from the passage; guide means for guiding the tassel portion of the corn plants into the passage defined by the walls of the housing means; a shaft rotatably supported on the side walls of the housing means and extending substantially transversely therebetween; impact cutting blade means mounted on the shaft and extending into that portion of the fore-and-aft passage lying between the downwardly and inwardly extending portions of the sidewalls, said blade means being intersected by the axis of the shaft and forming an oblique angle therewith, whereby said blade means reciprocates transversely in that portion of the passage lying between the lower portions of the sidewalls when the shaft is rotated, and is thereby operative to impact the tassel portion of the plants; and means for rotating said shaft at a sufficient velocity so that the impact of the blade on the tassel removes the latter from the plants.

6. Corn detasseling apparatus comprising: mobile frame means adapted to advance along a row of corn plants; structure mounted on the frame means and defining a fore-and-aft passage for the tassel portion of the plants, said structure including a pair of fore-and-aft extending, generally planar sides inclined downwardly and inwardly in a vertical plane transverse to said passage, the lower terminal edges of said sides defining the edges of a fore-and-aft opening through which the upper stalk portions of the plants pass as the apparatus is advanced along the row, the inclined, downwardly converging sides being operative to exclude plant leaves from the passage; and blade means mounted within the passage between the converging sides to sever the tassel portion from the plants.

7. The invention defined in claim 6 including a shaft rotatably supported on at least one of said sides and extending transversely in the fore-and-aft passage, said blade means being mounted on said shaft for rotation therewith.

8. The invention defined in claim 7 wherein said blade means comprises a substantially circular, planar blade having a plurality of teeth formed about its peripheral edge and connected at its center to said shaft to form an oblique angle therewith, whereby said blade reciprocates transversely in the passage as the shaft is rotated and is operative to sever the tassel portion from the plants.

9. For use in corn detasseling apparatus having a mobile frame adapted to advance along a row of corn plants, a detasseling unit comprising: a fore-and-aft extending, inverted U-shaped housing structure adapted for attachment to the frame and defining a fore-and-aft passage for the tassel portion of the plants, said housing structure having opposed, generally planar side walls converging downwardly and terminating in transversely spaced, fore-and-aft extending edges defining a fore-and-aft opening for the upper stalk portions of the plants, the downwardly converging side walls being operative to exclude the leaves of the plants from the fore-and-aft passage defined by the housing structure; shaft means rotatably supported on at least one of the side walls of the housing structure and extending transversely in the fore-and-aft passage defined by the housing; and cutting means connected to the shaft for rotation therewith in the passage, said cutting means being operative to engage the tassel portion of the plants moving through the passage and to sever said tassel portion from the plants.

* * * * *